United States Patent
Setty et al.

(10) Patent No.: US 11,170,411 B2
(45) Date of Patent: Nov. 9, 2021

(54) ADVANCED BIDDING FOR OPTIMIZATION OF ONLINE ADVERTISING

(71) Applicant: International Business Machines Corporation, Armonk, NY (US)

(72) Inventors: Uttam Setty, Bangalore (IN); Puneet Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 15/709,655

(22) Filed: Sep. 20, 2017

(65) Prior Publication Data
US 2019/0087868 A1    Mar. 21, 2019

(51) Int. Cl.
| | |
|---|---|
| G06Q 30/02 | (2012.01) |
| G10L 15/22 | (2006.01) |
| G10L 15/18 | (2013.01) |
| H04L 29/08 | (2006.01) |
| G06F 3/0482 | (2013.01) |

(52) U.S. Cl.
CPC ..... G06Q 30/0275 (2013.01); G06Q 30/0277 (2013.01); G10L 15/1815 (2013.01); G10L 15/22 (2013.01); H04L 67/02 (2013.01); H04L 67/20 (2013.01); G06F 3/0482 (2013.01)

(58) Field of Classification Search
CPC . G06Q 30/0275; G10L 15/1815; G10L 15/22; H04L 67/02; G06F 3/0482
USPC ............. 707/732, 726; 705/14.71, 14.54; 715/738
See application file for complete search history.

(56) References Cited

U.S. PATENT DOCUMENTS

| | | |
|---|---|---|
| 8,533,188 B2 | 9/2013 | Yan |
| 8,606,725 B1 | 12/2013 | Agichtein |
| 2002/0175936 A1 | 11/2002 | Tenembaum |

(Continued)

FOREIGN PATENT DOCUMENTS

| | | | | |
|---|---|---|---|---|
| CN | 104965890 A | 10/2015 | | |
| WO | WO-02060139 A2 * | 8/2002 | ......... | H04L 25/0236 |
| WO | 2014113396 A1 | 7/2014 | | |

OTHER PUBLICATIONS

Tim Nichols, Kuang-Chih Lee, Advertising Optimization, 2013 (Year: 2013).*

(Continued)

*Primary Examiner* — Tarek Elchanti
(74) *Attorney, Agent, or Firm* — Aaron N. Pontikos (57) ABSTRACT

A computer-implemented method includes identifying a plurality of hyperlinks on a first webpage. The computer-implemented method further includes determining, for each hyperlink in the plurality of hyperlinks, a degree of likelihood that a user will select a given hyperlink in the plurality of hyperlinks. The computer-implemented method further includes initiating a first bid request for a first ad space for a second webpage that is accessible by a first hyperlink in the plurality of hyperlinks based on the first hyperlink having a degree of likelihood above a given threshold level. The computer-implemented method further includes determining a selection of the first hyperlink by the user. The computer-implemented method further includes displaying a first advertisement associated with a first winning bid on the second webpage. A corresponding computer system and computer program product are also disclosed.

15 Claims, 3 Drawing Sheets

(56) References Cited

U.S. PATENT DOCUMENTS

2008/0140643 A1    6/2008  Ismalon
2012/0078714 A1    3/2012  Gross
2012/0253930 A1   10/2012  Gao
2014/0351046 A1   11/2014  Carlyle
2015/0120468 A1    4/2015  Knapp
2015/0269488 A1    9/2015  Galai

OTHER PUBLICATIONS

"Real-time bidding", From Wikipedia, the free encyclopedia, This page was last edited on Jun. 2, 2017, 3 pages, <https://en.wikipedia.org/wiki/Real-time_bidding>.

Graepel et al., "Web-Scale Bayesian Click-Through Rate Prediction for Sponsored Search Advertising in Microsoft's Bing Search Engine", Proceedings of the 27th International Conference on Machine Learning ICML 2010, 3 pages, <https://www.microsoft.com/en-us/research/publication/web-scale-bayesian-click-through-rate-prediction-for-sponsored-search-advertising-in-microsofts-bing-search-engine/#>.

* cited by examiner

ADVANCED BIDDING FOR OPTIMIZATION OF ONLINE ADVERTISING

BACKGROUND

The present invention relates generally to the field of online advertising, and more particularly to real-time bidding for advertising space.

Online advertising (i.e., online marketing, internet advertising, web advertising) is a form of marketing and advertising which uses the internet and other applications to deliver promotional marketing messages to consumers. Online advertising includes email marketing, search engine marketing, social media marketing, mobile advertising, and display advertising. Display advertising can be presented in many forms, including web banner advertisements, pop-up advertisements, floating advertisements, expanding advertisements, and news feed advertisements, as well as in many formats (e.g., text, logos, animation, images, photographs, flash video, audio, or any combination thereof). Similar to other advertising mediums, online advertising generally involves an advertiser, who provides the advertisement to be displayed, and a publisher who integrates advertisements into its published online content.

Real-time bidding ("RTB") is a means by which advertising inventory is bought and sold through real-time auctions. Generally, the real-time auctions are facilitated by advertisement exchanges (i.e. ad exchanges). With real-time bidding, advertising buyers bid on online advertisement impressions (i.e. ad impressions) and, if the bid is won, the buyer's ad is displayed on the publisher's webpage. Here, prices for the advertisement space are determined by the bidding.

SUMMARY

A computer-implemented method includes identifying a plurality of hyperlinks on a first webpage. The computer-implemented method further includes determining, for each hyperlink in the plurality of hyperlinks, a degree of likelihood that a user will select a given hyperlink in the plurality of hyperlinks. The computer-implemented method further includes initiating a first bid request for a first ad space for a second webpage that is accessible by a first hyperlink in the plurality of hyperlinks based on the first hyperlink having a degree of likelihood above a given threshold level. The computer-implemented method further includes determining a selection of the first hyperlink by the user. The computer-implemented method further includes displaying a first advertisement associated with a first winning bid on the second webpage. A corresponding computer system and computer program product are also disclosed.

DETAILED DESCRIPTION

Real-time bidding refers to the buying and selling of online ad impressions through real-time auctions that occur during the time it takes for a webpage to load. Current real-time bidding transactions begin when a user requests to load a webpage (either by selecting a hyperlink (i.e., "link") or entering a web address (i.e., "URL") into a web browser). When a user initially requests to load a webpage, a publisher content server (i.e., supply side server) transmits the content of the webpage being requested to the user's web browser via the Internet. At this point, the webpage does not include any advertisements, but merely ad impressions (i.e., "ad space"). An ad impression is a link or "slot" embedded in the webpage that is reserved for an advertisement. The request to load the webpage further triggers the transmittal of a bid request from the publisher content server to an ad exchange. The bid request includes various information, such as the user's demographic information, browser history (i.e., cookies), previous purchases, location, as well as information about the webpage that is being loaded. Here, the bid request is transmitted from a publisher of the content included in the requested webpage to the ad exchange.

An ad exchange is a digital market technology platform designed to facilitate transactions between online advertisers and content publishers. The ad exchange submits the bid request and any accompanying information to multiple advertisers who automatically submit bids in real-time to display advertisements on the webpage. Based on the information accompanying the bid request, each advertiser determines whether they want to bid on an ad impression, as well as how much they are willing to offer for the ad impression. Advertisers bid on each ad impression as it is served and each ad impression goes to the highest bidder. Once a winner of the ad impression is determined, a link corresponding to an advertisement of the winning bidder is displayed on the webpage via the user's web browser. This process is repeated for every ad impression available on the webpage.

Embodiments of the present invention recognize that oftentimes, the bidding process in current real-time bidding methods cannot be completed within the typical time it takes to load a webpage. This stems from the fact that a webpage cannot be loaded onto a user's web browser until the bidding process has finished and the links corresponding to the winning advertisements are integrated into the content of the webpage. Accordingly, current real-time bidding methods can increase the amount of time it takes for a web browser to load a webpage. This ultimately delays access of the webpage by the user. Embodiments of the present invention further recognize that the increase in time required for a web browser to load a webpage results in a decrease in available computing resources and network bandwidth.

Embodiments of the present invention further recognize that current real-time bidding transactions may be completed within a few hundred milliseconds of an ad exchange receiving a bid request. Accordingly, an advertisement company only has a few hundred milliseconds of time to analyze user information accompanying the bid request, determine whether to bid on an ad impression, and determine the amount to bid. This lack of time to thoroughly analyze user information accompanying a bid request can result in an improper decision to bid on an ad impression, as well as overbidding for an ad impression.

Embodiments of the present invention provide for an advanced real-time bidding system that resolves the aforementioned deficiencies associated with current real-time bidding methods. Embodiments of the present invention proactively initiate real-time bidding prior to a user request to load a webpage. In some embodiments, real-time bidding for ad space for a webpage is initiated based on determining a likelihood that a user will access the webpage (i.e., select a hyperlink or an embedded hyperlink). In an embodiment, real-time bidding is initiated for a webpage that is accessible by a link if a likelihood or of a user selecting the link exceeds a given threshold level.

By initiating the bidding process prior to or in advance to a request to load a webpage, delays in loading a webpage due to current real-time bidding methods are eliminated. Accordingly, the advanced real-time bidding system of the present invention provides for faster loading of webpages. Furthermore, by initiating the bidding process prior to a request to load a webpage, computing resources (e.g., loading of a webpage by a web browser software) and network resources (e.g., network bandwidth) utilized at the expense of the bidding process are shifted from client side services to server side services, such as advertisement agencies and ad exchanges.

Moreover, initiating the bidding process prior to a request to load a webpage significantly increases the amount of time available to conduct the bidding process. Thus, an increase in time to conduct the bidding process allows for a more in depth analysis of user information provided with a bid request. Accordingly, this additional time to analyze this information provides for more efficient bidding practices. For example, an advertisement company can better determine whether or not to bid on an ad impression. In another example, if an advertisement company decides to bid on an ad impression, the advertisement company can reduce the risk of overbidding. This ultimately ensures that the advertisements displayed on a webpage are relevant to a user's specific, individual interests.

Figure 1:
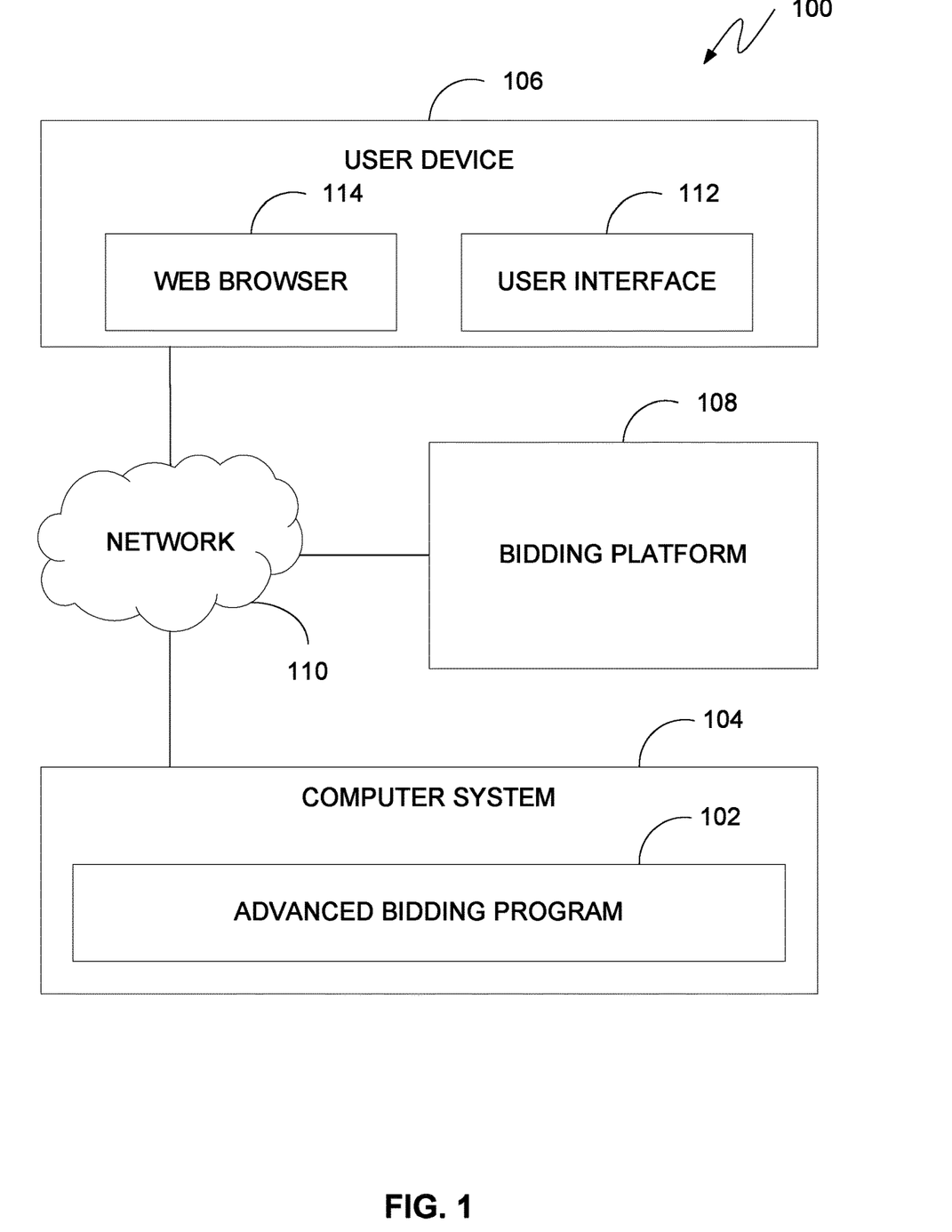
FIG. 1 is a functional block diagram of a computing environment suitable for operation of an advanced bidding program in accordance with at least one embodiment of the invention.

Referring now to various embodiments of the invention in more detail, FIG. 1 is a functional block diagram of a computing environment, generally designated 100, suitable for operation of an advanced bidding program 102 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer system 104, user device 106, and bidding platform 108 interconnected over network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between computer system 104, user device 106, bidding platform 108, and other computing devices (not shown) within computing environment 100.

Computer system 104 can be a standalone computing device, a management server, a web server, a mobile computing device, or any other electronic device or computing system capable of receiving, sending, and processing data. In other embodiments, computer system 104 can represent a server computing system utilizing multiple computers as a server system, such as in a cloud computing environment. In an embodiment, computer system 104 represent a computing system utilizing clustered computers and components (e.g. database server computers, application server computers, etc.) that act as a single pool of seamless resources when accessed within computing environment 100. Computer system 104 includes advanced bidding program 102. Computer system 104 may include internal and external hardware components, as depicted and described in further detail with respect to FIG. 3.

User device 106 can be a laptop computer, tablet computer, smartphone, smartwatch, or any programmable electronic device capable of communicating with various components and devices within computing environment 100, via network 110. In general, user device 106 represents any programmable electronic devices or combination of programmable electronic devices capable of executing machine readable program instructions and communicating with other computing devices (not shown) within computing environment 100 via a network, such as network 110.

User device 106 includes user interface 112. User interface 112 provides an interface between user device 106 and computer system 104. In some embodiments, user interface 112 may be a graphical user interface (GUI) or a web user interface (WUI) and can display text, documents, web browser windows, user options, application interfaces, and instructions for operation, and include the information (such a graphic, text, and sound) that a program present to a user and the control sequences the user employs to control the program. In another embodiment, user interface 112 may also be mobile application software that provides an interface between user device 106 and computer system 104. Mobile application software, or an "app", is a computer program that runs on smartphones, tablet computers, smartwatches and other mobile devices.

User device 106 includes web browser 114. In embodiments of the invention, web browser 114 is a software application for retrieving, presenting and traversing web resources on the World Wide Web ("WWW"). A web resource is anything that can be obtained from the WWW, such as webpages, e-mail, information from databases, and web services. A web resource is referenced by a uniform resource locator ("URL") (i.e., web address), which specifies the location where the web resource can be retrieved. Web browser 114 also stores HTTP cookies (i.e., web cookies, browser cookies, or cookie). A cookie is a small piece of data sent from a webpage. Cookies are reliable mechanisms for webpages to remember stateful information (such as items added in a shopping cart of an online store) or to record a user's browsing activity (e.g., which buttons or links were clicked or which webpages a user previously visited).

Bidding platform 108 is a digital market technology platform designed to facilitate transactions between online advertisers and content publishers. In other words, bidding platform 108 allows multiple advertisers to bid on and purchase ad space on a content publisher's webpage. In some embodiments, bidding platform 108 is an ad exchange. In embodiments of the invention, advanced bidding program 102 submits bid requests to bidding platform 108. Here, the same bid request is directed toward multiple advertisers. In some embodiments, various information, such as the user's demographic information, browser history (i.e., cookies), previous purchases, location, as well as information about a currently viewed webpage is included with the bid request. In some embodiments, at least a portion of the information used by advanced bidding program 102 to determine a degree of likelihood that a user will select a link is included with the bid request. Bidding platform 108 further allows advertisers to analyze the information included with the bid request in order to determine whether to bid, and how much to bid for the ad space corresponding to the bid request. In some embodiments, bidding platform 108 is used in accordance with advanced bidding program 102. In other embodiments, bidding platform 108 is used in accordance with current real-time bidding methods.

Figure 2:
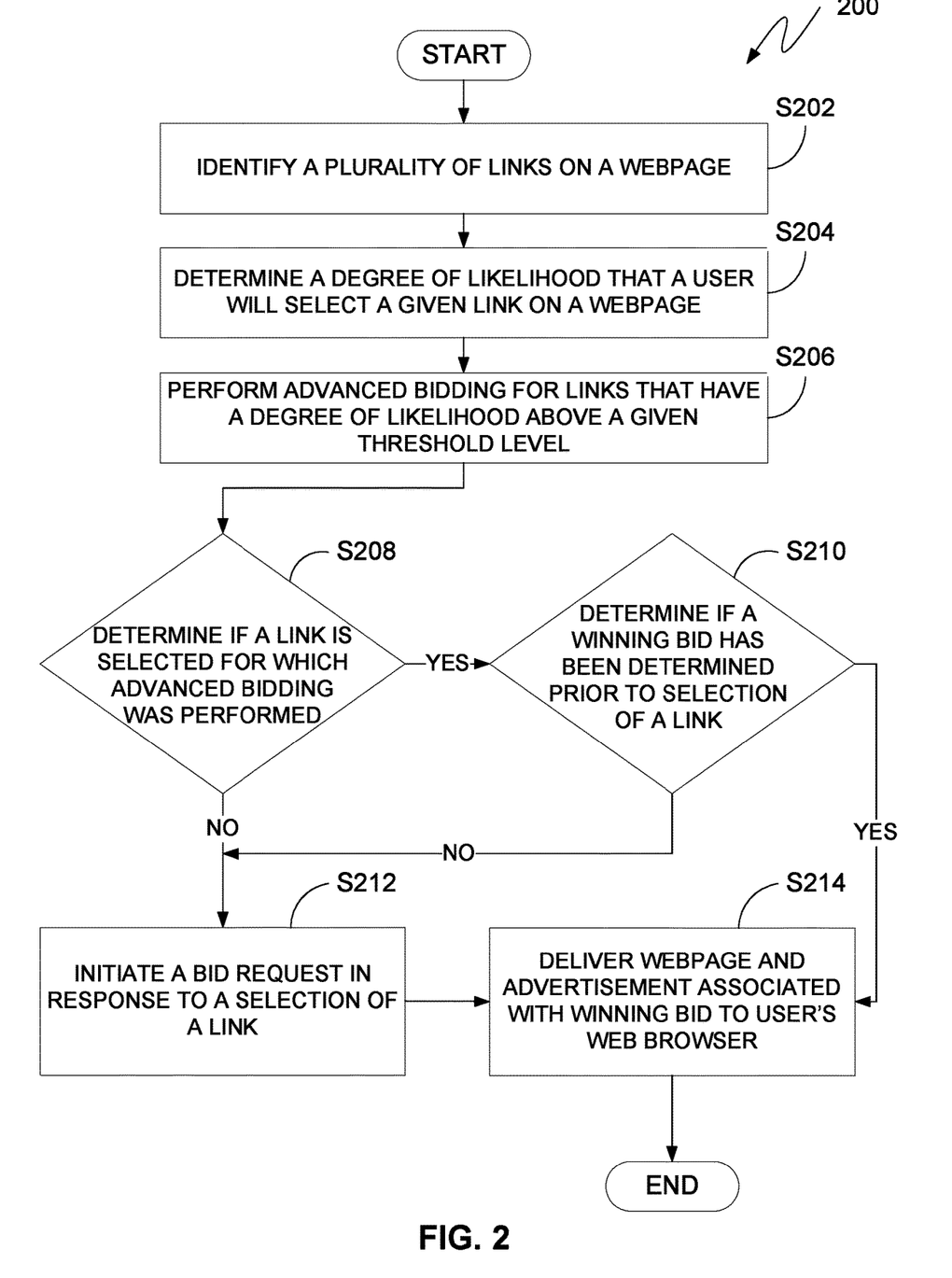
FIG. 2 is a flow chart diagram depicting operational steps for an advanced bidding program in accordance with at least one embodiment of the invention.

FIG. 2 is a flow chart diagram depicting operational steps for advanced bidding program 102 in accordance with at least one embodiment of the invention. It should be appreciated that embodiments of the present invention provide for the initiation of a bid request for ad space for one or more links on a webpage prior to a user request to load a webpage corresponding to the one or more links. Thus, in accordance with the present invention, the bidding for ad space and the determination of winning bids is completed prior to a request to load a webpage.

At step S202, advanced bidding program 102 identifies a plurality of links on a webpage. In some embodiments, advanced bidding program 102 identifies links on a webpage loaded in web browser 116. In some embodiments, advanced bidding program 102 identifies links on a webpage that are not loaded in web browser 116. In some embodiments, advanced bidding program 102 uses web crawling software (i.e., web spider software) to identify links on a webpage. Web crawling software systematically visits webpages based on a list of URL's to identify links and embedded links included on a webpage. In some embodiments, advanced bidding program 102 uses link checker software to identify links on a webpage. Link checker software identifies links on a webpage to test the validity or operability of links to other websites, as well as links between webpages on the same website.

At step S204, advanced bidding program 102 determines a degree of likelihood that a user will select a given link on the webpage. In some embodiments, advanced bidding program 102 determines a degree of likelihood for a given link for a portion of the plurality of links identified on the webpage. In some embodiments, advanced bidding program 102 determines a degree of likelihood for a given link for each of the plurality of links identified on the webpage. In embodiments of the invention, advanced bidding program 102 assigns a weighted score to a link based on the degree of likelihood that a user will select the link. The higher the score, the higher the degree of likelihood that a user will select the link. The lower the score, the lower the degree of likelihood that a user will select the link.

In some embodiments, advanced bidding program 102 uses predictive analytics software to determine the degree of likelihood. Predictive analytics includes a variety of statistical techniques, such as predictive modeling software, machine learning software, and data mining software, used to analyze current and historical facts to make predictions about future or otherwise known events. Here, advanced bidding program 102 analyzes various information to discover trends and behavioral patterns associated with a particular individual to determine which links a user will most likely select. Types of information advanced bidding program may use to determine a degree of likelihood that a user will select a link include, but are not limited to the number of links on the current webpage, the location of each link on the webpage, the size of each link, contextual information (e.g., topics or themes) presented on a linked webpage, contextual information presented on the current webpage, interests of user of subject matter on linked page, browsing history, recent activities, long term trends, and the amount of user traffic on a linked webpage.

In some embodiments, a degree of likelihood that a user will select a given link is based on click-through rate ("CTR") information. A click-through rate is the ratio of users who click on a particular link to the number of total users who view a webpage. In some embodiments, a degree of likelihood that a user will select a given link is based on click path (i.e., clickstream) information. A click path is the sequence of links that a user selects while navigating between successive webpages.

In some embodiments, a degree of likelihood that a user will select a given link is based on determining a focus area of a webpage. In these embodiments, advanced bidding program 102 may increases a link's score based on an amount of time a user is focused on a particular area of a webpage that includes a link. In an embodiment, advanced bidding program 102 determines a focus area of a webpage based on tracking a user's eye position and eye movements while viewing content presented on a webpage. In an embodiment, advanced bidding program 102 determines a focus area of a webpage based on tracking a user's eye position and eye movements relative to a link or embedded link on a webpage. In these embodiments, advanced bidding program 102 uses eye tracking software to measure a user's eye position and eye movements relative to a particular area of a webpage. Here, advanced bidding program 102 analyzes image and or video data captured by a camera or video camera to determine a user's eye positions and eye movements. For example, a webpage can be divided into a number of quadrants or partitions. Based on the user's eye position relative to a particular quadrant of the webpage, advanced bidding program 102 can determine the user focus area of the webpage. Depending on the content included in the portion of the webpage corresponding to the user focus area, as well as the content of the webpages corresponding to the links included in the portion of the webpage corresponding to the user focus area, advanced bidding program 102 may adjust the score to these links. In an embodiment, advanced bidding program 102 increases a links score based on a degree of associativity between the content of a first webpage corresponding to a user focus area and the content of a second webpage accessible by a link on the first webpage.

In some embodiments, advanced bidding program 102 determines a focus area of a webpage based on tracking a user's cursor position and/or movements relative to a particular area of webpage. A cursor may generally be understood as an indicator used to show the current position for user interaction on a display device, such as user device 106. A cursor can be moved, for example, through the use of a keyboard, mouse, and for touchscreen applications, through the use of a stylus or finger. In an embodiment, advance bidding program 102 determines a focus area of a webpage based on tracking a user's cursor position and movements relative to particular content presented on a webpage. In an embodiment, advanced bidding program 102 determines a focus area of a webpage based on tracking a user's cursor position and movements relative to a position of a link on a webpage. In these embodiments, advanced bidding program uses cursor tracking software to track cursor position, movements, and actions (e.g., clicks and scrolls) as a user navigates a webpage. In an embodiment, advanced bidding program 102 increases a links score based on a number of times a cursor is positioned on a portion of a webpage that includes the link. In an embodiment, advanced bidding program 102 increases a links score based on an amount of time a cursor is positioned on a portion of a webpage that includes the link.

In some embodiments, a degree of likelihood that a user will select a given link is based on determining a sentiment of a user relative to a focus area of a webpage. In these embodiments, advanced bidding program 102 analyzes image and/or video data captured by a camera or video camera to determine a user's sentiment with respect to webpage content included in the focus area. In an embodiment, advanced bidding program 102 uses facial recognition software to determine a user's sentiment. Here, advanced bidding program 102 compares a user's facial expression data to commonly known sentiments associated with particular facial expressions. For example, a frown may indicate sadness or a negative sentiment. On the other hand, a smile may indicate happiness or a positive sentiment. In an embodiment, advanced bidding program 102 adjusts a link's score based on a sentiment of a user relative to content included in a particular area on the webpage that includes the link. For example, advanced bidding program 102 increases a link's score for positive sentiments and decreases a link's score for negative sentiments.

In some embodiments, a degree of likelihood that a user will select a given link is based on analyzing utterances of a user relative to a determined focus area of a webpage. An utterance can include verbal communications (e.g., words or statements) and non-lexical communications (e.g., exclamations, sighs, laughs, cries, and shouts). In these embodiments, advanced bidding program 102 analyzes utterances captured by a microphone to determine a user's interest or opinion with respect to webpage content included in the focus area. In an embodiment, advanced bidding program 102 uses speech analytics software (e.g., audio mining software) to analyze the utterances in order to determine an interest or an opinion of a user relative to content included in a particular area on the webpage. In an embodiment, advanced bidding program 102 adjusts a link's score based on whether an opinion of a user is positive or negative with respect to content included in a particular area on the webpage that includes the link. Here, a link's score is increased for positive opinions and decreased for negative opinions. In an embodiment, advanced bidding program 102 adjusts a link's score based on a level of interest of a user relative to content included in a particular area on the webpage that includes the link. Here, a link's score is increased as the level of interest increases and decreased as the level of interest decreases.

At step S206, advanced bidding program 102 performs advanced bidding. Advanced bidding may generally be understood as initiating a bid request for one or more links on a webpage prior to a selection of a link on the webpage. In other words, a bid request is initiated prior to or in advance of a user requesting to load a webpage corresponding to a link on the webpage. In embodiments of the invention, advanced bidding is performed for a link based on the link having a degree of likelihood that a user will select the link above a given threshold level. In these embodiments, each bid request is sent to bidding platform 108. Upon initiating a bid request, advertising companies that receive a bid request bid on ad impressions for a webpage corresponding to a link that has a degree of likelihood of a user selecting the link above a given threshold level. It should be appreciated advanced bidding program 102 may perform advanced bidding for each link or a portion of links on a webpage that have a degree of likelihood above the given threshold level.

In some embodiments, advanced bidding program 102 initiates a separate bid request for each of the one or more links. In some embodiments, advanced bidding program 102 initiates a single bid request for the one or more links. In some embodiments, advanced bidding program 102 initiates a bid request after determining a degree of likelihood for all of the links on a webpage. In some embodiments, advanced bidding program 102 initiates a bid request after a predetermined period of time. For example, a bid request is initiated after a webpage has been loaded for more than 5 seconds. In these embodiments, advanced bidding program 102 initiates a bid request even if a degree of likelihood for all of the links on a webpage has not been determined.

In embodiments of the invention, a bid request is initiated for a link based on a degree of likelihood that a user will select the link. In some embodiments, a bid request is initiated for a link if the link has a degree of likelihood that exceeds a given threshold level. In an embodiment, a bid request is initiated for a percentage of the links on a webpage that have the highest probabilities. For example, a bid request is initiated for the top ten percent of the links that have the highest probabilities. In an embodiment, a bid request is initiated for a predetermined number of links that have the highest probabilities. For example, a bid request is initiated for the top 10 links that have the highest probabilities.

In some embodiments, advanced bidding program 102 cancels a bid request. In an embodiment, advanced bidding program 102 cancels a bid request if a user fails to select a link within a predetermined period of time. For example, a bid request is cancelled if a user fails to select a link within 30 seconds from the time a webpage is loaded. In an embodiment, a bid request is cancelled if advanced bidding program 102 determines a new focus area of the webpage. For example, advanced bidding program 102 may determine a degree of likelihood of a user selecting one or more links included in a first portion of a webpage that is viewable on a display screen. However, if a user scrolls up or down, such that a second, different portion of a webpage is viewable on the display screen, advanced bidding program 102 cancels a bid request for a link corresponding to the first portion of the webpage that is no longer viewable on the display screen. By cancelling a bid request based on determining a change in the focus area, advanced bidding program 102 can adjust the degree of likelihood of a user selecting a particular link on the webpage. In an embodiment, advanced bidding program 102 resubmits a bid request for one or more links if the user returns to a previously viewed portion of a webpage. In an embodiment, advanced bidding program 102 submits a new bid request for one or more links if the user return to a previously viewed portion of a webpage. In this embodiment, a new bid request may reflect any adjustments made to the degree of likelihood of a user selecting a particular link between the time a user returns to a previously viewed portion of a webpage. In an embodiment, advanced bidding program 102 submits a new bid request for one or more links included in a new focus area of a webpage.

In some embodiments, the amount of available time to bid on ad impressions (i.e., ad space) is predetermined. In other words, once a bid request is initiated, advanced bidding program 102 receives bids for an ad impression for a webpage for a given amount of time. For example, once a bid request is initiated, advertising companies have three seconds to bid on an ad impressions for a second webpage accessible by a link on the first webpage that a user is currently viewing. However, the amount of available time to bid on ad impressions should not be excessive. This will help to ensure that bidding is completed prior to a user selecting a link. Once the predetermined amount of time to bid on ad impressions for a given bid request has ended, the advertising company with the highest bid for each ad impression is declared the winner. Accordingly, a winning bid for each ad impression for a second webpage accessible by a link on the first webpage is determined in advance of a user selecting a link on the webpage.

At decision step S208, advanced bidding program 102 determines if a link is selected on a webpage for which advanced bidding was performed in accordance with step S206. Here, the selection of a link triggers a request to a webserver (e.g., publisher content server) to transmit the content of the webpage corresponding to the link to the user's web browser. If a link is selected for which advanced bidding was performed, advanced bidding program 102 proceeds to decision step S210 (decision step "YES" branch). If a link is selected for which advanced bidding was not performed, advanced bidding program 102 proceeds to step S212 (decision step "NO" branch).

At decision step S210, advanced bidding program 102 determines if a winning bid has been determined prior to a selection of a link for which advanced bidding was performed. In other words, advanced bidding program 102 determines if the selection of a link for which advanced bidding was performed is prior to the end of the first predetermined period of time for which bids can be placed. For example, a user may select a link for which advanced bidding was performed, but the bidding was not completed prior to a selection of the link on the webpage. Accordingly, a winning bid may not have been determined at this point since the predetermined time period for which bids can be placed has not ended. If a winning bid is determined prior to a selection of a link for which advanced bidding was performed, advanced bidding program proceeds to step S214 (decision step "YES" branch). If a winning bid is not determined prior to a selection of a link for which advanced bidding was performed, advanced bidding program terminates the advanced bidding (i.e., cancels the bid request) and proceeds to step S212 (decision step "NO" branch). In an alternative embodiment, if a winning bid has not been determined prior to a selection of a link for which advanced bidding was performed, advanced bidding program 102 does not proceed to step S212. In this embodiment, advanced bidding program 102 determines a winning bid based on the highest bid at the time of the selection of the link by the user and proceeds to step S214.

At step S212, advanced bidding program 102 initiates a bid request in response to a selection of a link by a user. Here, advanced bidding program 102 initiates a bid request in accordance with current real-time bidding methods. In other words, the bid request is initiated after the selection of the link by a user. Accordingly, a winning bid for each ad impression for a second webpage accessible by a link on the first webpage is determined after the selection of the link by the user. In some embodiments, advanced bidding program 102 initiates a bid request based on a selection of a link that has a degree of likelihood that a user will select the link below a given threshold level.

At step S214, advanced bidding program 102 displays an advertisement associated with a winning bid on a second webpage corresponding to the link selected by a user on the first webpage. Here, advanced bidding program 102 delivers the content of the second webpage and the advertisement associated with the winning bid to the user's web browser.

Figure 3:
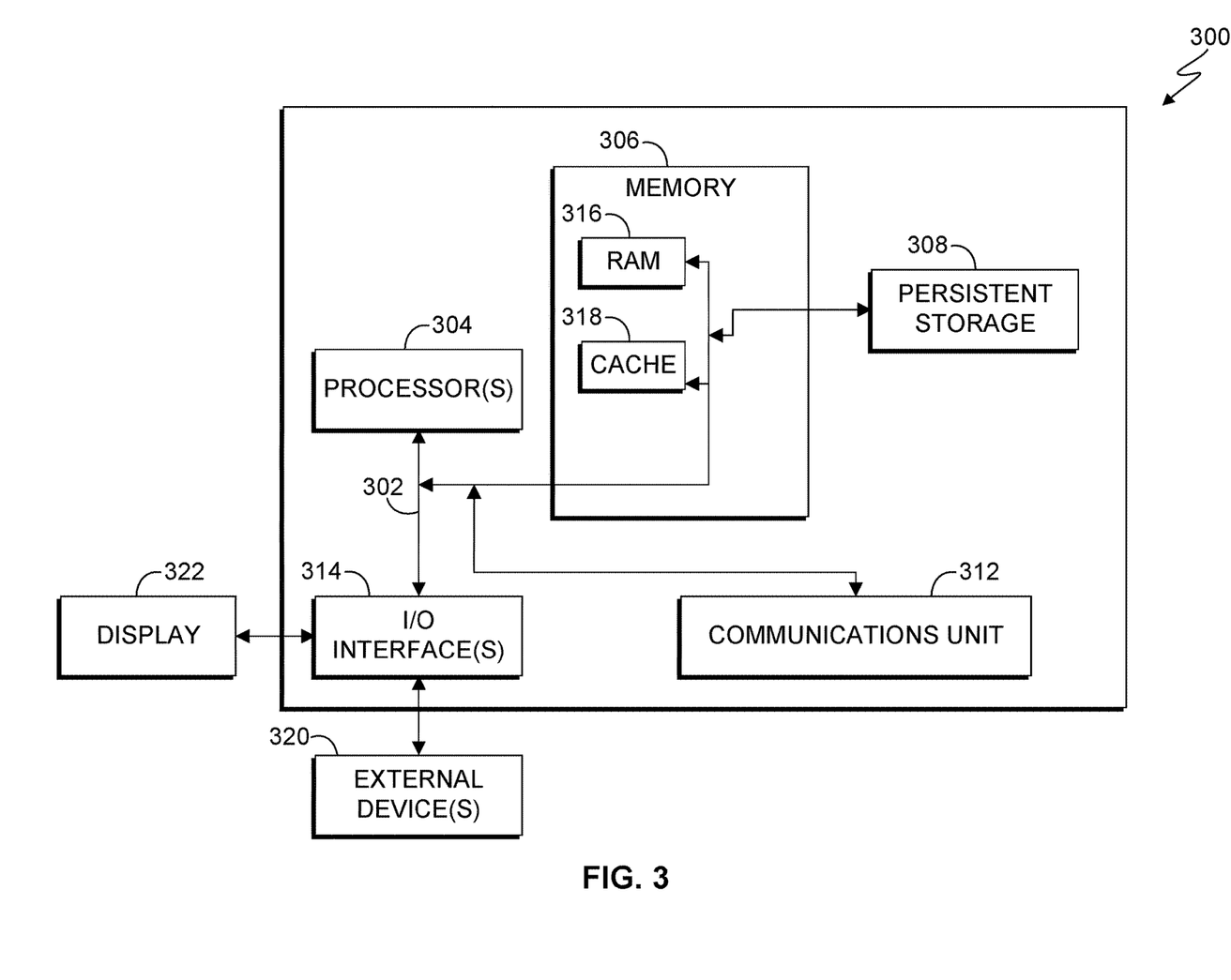
FIG. 3 is a block diagram depicting components of a computer suitable for executing an advanced bidding program in accordance with at least one embodiment of the invention.

FIG. 3 is a block diagram depicting components of a computer 300 suitable for advanced bidding program 102, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for advanced bidding program 102 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying a plurality of hyperlinks displayed on a first webpage loaded in a web browser;
determining a degree of likelihood of a user selecting a first hyperlink in the plurality of hyperlinks corresponding to a second webpage;
prior to receiving a request to load the second webpage in the web browser via selection of the first hyperlink:
transmitting a bid request to an ad exchange for an ad space reserved for displaying an advertisement on the second webpage, wherein the bid request is transmitted to the ad exchange in response to determining a degree of likelihood above a given threshold level of the user selecting the first hyperlink; and
determining an advertisement associated with a winning bid to be displayed in the ad space reserved on the second webpage; and
loading, in response to a selection of the first hyperlink by the user, the second webpage in the web browser, wherein the second webpage includes the advertisement associated with the winning bid.

2. The computer-implemented method of claim 1, wherein transmitting a bid request to an ad exchange for an ad space reserved for displaying an advertisement on the second webpage further includes:
receiving bids for the ad space for the second webpage for a predetermined period of time.

3. The computer-implemented method of claim 2, further comprising:
determining the advertisement associated with the winning bid based on a highest bid at the end of the predetermined period of time.

4. The computer-implemented method of claim 1, wherein determining a degree of likelihood of a user selecting the first hyperlink in the plurality of hyperlinks is based, at least in part, on:
determining a focus area of the user on the first webpage.

5. The computer-implemented method of claim 1, wherein determining a degree of likelihood of a user selecting the first hyperlink in the plurality of hyperlinks is based, at least in part, on:
determining a sentiment of the user relative to the focus area on the first webpage.

6. The computer-implemented method of claim 1, wherein determining a degree of likelihood of a user selecting the first hyperlink in the plurality of hyperlinks is based, at least in part, on:
analyzing utterances of the user relative to the focus area on the webpage; and
determining at least one of an opinion and a level of interest relative to the focus area on the first webpage.

7. A computer program product, the computer program product comprising one or more computer readable storage media and program instructions stored on the one or more computer readable storage media, the program instructions comprising instructions to:
identify a plurality of hyperlinks displayed on a first webpage loaded in a web browser;
determine a degree of likelihood of a user selecting a first hyperlink in the plurality of hyperlinks corresponding to a second webpage;
prior to receiving a request to load the second webpage in the web browser via selection of the first hyperlink:
transmit a first bid request for an ad space reserved for displaying an advertisement on the second webpage, wherein the bid request is transmitted to the ad exchange in response to determining a degree of likelihood above a given threshold level of the user selecting the first hyperlink; and
determine an advertisement associated with a winning bid to be displayed in the ad space reserved on the second webpage; and
load, in response to a selection of the first hyperlink by the user, the second webpage in the web browser, where the second webpage includes the advertisement associated with the winning bid.

8. The computer program product of claim 7, wherein the program instructions to transmit a bid request to an ad exchange for an ad space reserved for displaying an advertisement on the second webpage further further comprise instructions to:
receive bids for the ad space for the second webpage for a predetermined period of time.

9. The computer program product of claim 8, further comprising program instructions to:
determine the advertisement associated with the winning bid based on a highest bid at the end of the predetermined period of time.

10. The computer program product of claim 7, wherein the program instructions to determine a degree of likelihood a user selecting the first hyperlink in the plurality of hyperlinks is based, at least in part, on program instructions to:
determine a focus area of the user on the first webpage.

11. The computer program product of claim 7, wherein the program instructions to determine a degree of likelihood a user selecting the first hyperlink in the plurality of hyperlinks is based, at least in part, on program instructions to:
determine a sentiment of the user relative to the focus area on the first webpage.

12. The computer program product of claim 7, wherein the program instructions to determine a degree of likelihood a user selecting the first hyperlink in the plurality of hyperlinks is based, at least in part, on program instructions to:
analyze utterances of the user relative to the focus area on the webpage; and
determine at least one of an opinion and a level of interest relative to the focus area on the first webpage.

13. A computer system comprising:
one or more computer processors;
one or more computer readable storage media;
computer program instructions;
the computer program instructions being stored on the one or more computer readable storage media for execution by the one or more computer processors; and
the computer program instructions comprising instructions to:
identify a plurality of hyperlinks displayed on a first webpage loaded in a web browser;

determine a degree of likelihood of a user selecting a first hyperlink in the plurality of hyperlinks corresponding to a second webpage;

prior to receiving a request to load the second webpage in the web browser via selection of the first hyperlink:

transmit a first bid request for an ad space reserved for displaying an advertisement on the second webpage, wherein the bid request is transmitted to the ad exchange in response to determining a degree of likelihood above a given threshold level of the user selecting the first hyperlink; and determine an advertisement associated with a winning bid to be displayed in the ad space reserved on the second webpage; and load, in response to a selection of the first hyperlink by the user, the second webpage in the web browser, where the second webpage includes the advertisement associated with the winning bid.

14. The computer system of claim 13, wherein the program instructions to transmit a bid request to an ad exchange for an ad space reserved for displaying an advertisement on the second webpage further comprise instructions to:

receive bids for the ad space for the second webpage for a predetermined period of time.

15. The computer system of claim 14, further comprising program instructions to:

determine the advertisement associated with the winning bid based on a highest bid at the end of the predetermined period of time.

* * * * *